United States Patent [19]

Indech

[11] 4,284,838
[45] Aug. 18, 1981

[54] THERMOELECTRIC CONVERTER AND METHOD

[76] Inventor: Robert B. Indech, 46 Roger Williams Green, Providence, R.I. 02904

[21] Appl. No.: 46,269

[22] Filed: Jun. 7, 1979

[51] Int. Cl.³ .................... H07L 37/00; H01L 35/00
[52] U.S. Cl. .................................. 136/202; 136/205; 136/206; 136/208; 136/209
[58] Field of Search ............... 136/202, 205, 206, 208, 136/209, 211

[56] References Cited

U.S. PATENT DOCUMENTS

| | | | |
|---|---|---|---|
| 3,923,551 | 12/1975 | Purdy | 136/205 |
| 3,931,673 | 1/1976 | Eggemann | 136/205 |
| 4,018,625 | 4/1977 | Tinti | 136/202 |

*Primary Examiner*—Leland A. Sebastian

[57] ABSTRACT

The invention comprises the conversion of thermal power into electrical energy. Two dissimilar metals, such as aluminum and brass, are separated by a heat conductive and electrical conductive material. Water makes a good separator. When a fluid is used, it is heated and caused to flow between the dissimilar metals. The metals may be in the form of rectangular plates and they act as electrodes from which the electrical power is tapped by suitable lines. In the above case the fluid is heated and passed between the metals, the internal temperature being greater than the outside of the metal plates. If desired, the outside of the metal plates may be additionally cooled. In a variation, the heat may be applied to the outside of one metal and passed through the metal, the separator, in this case preferably solid, and through the other metal. Again the other metal plate may be independently cooled. The heat can be applied in any conventional manner and solar heat can readily be used. In circulating the hot fluid, a portion of the power generated may be used to power a circulating pump. Any variation of the above basic design will produce usable electrical energy. If desired, the metal plates may be placed in series to increase the output power, but they must still be spaced. A typical series may have brass-separator-aluminum-separator-brass-separator-aluminum. The separator may be hot water or any other heat and electrical conductor.

11 Claims, 3 Drawing Figures

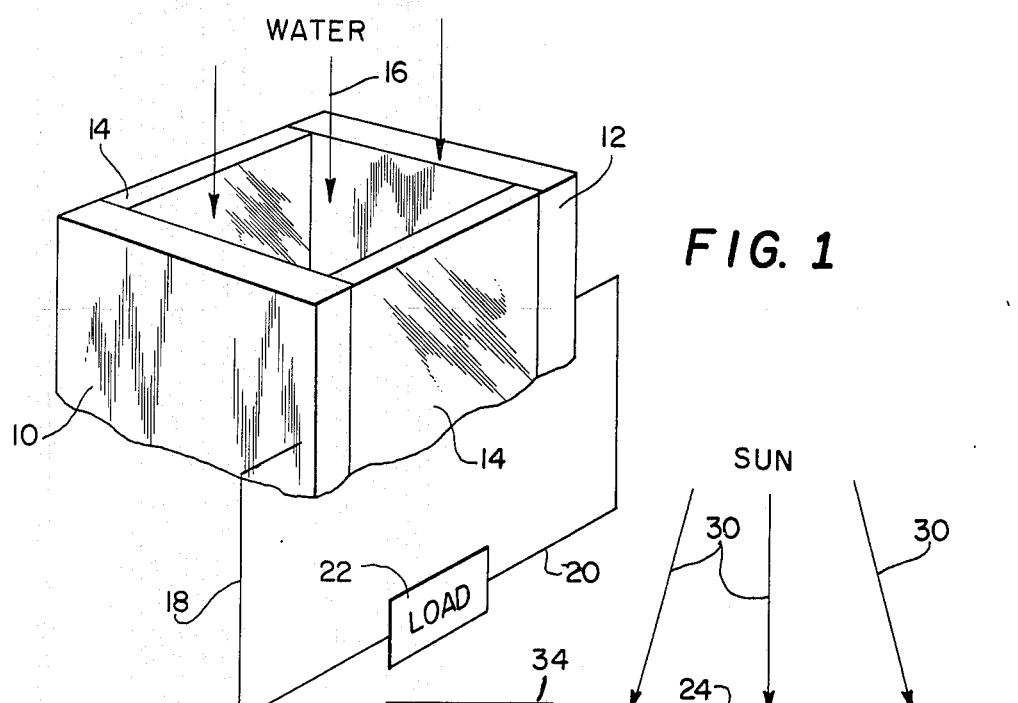
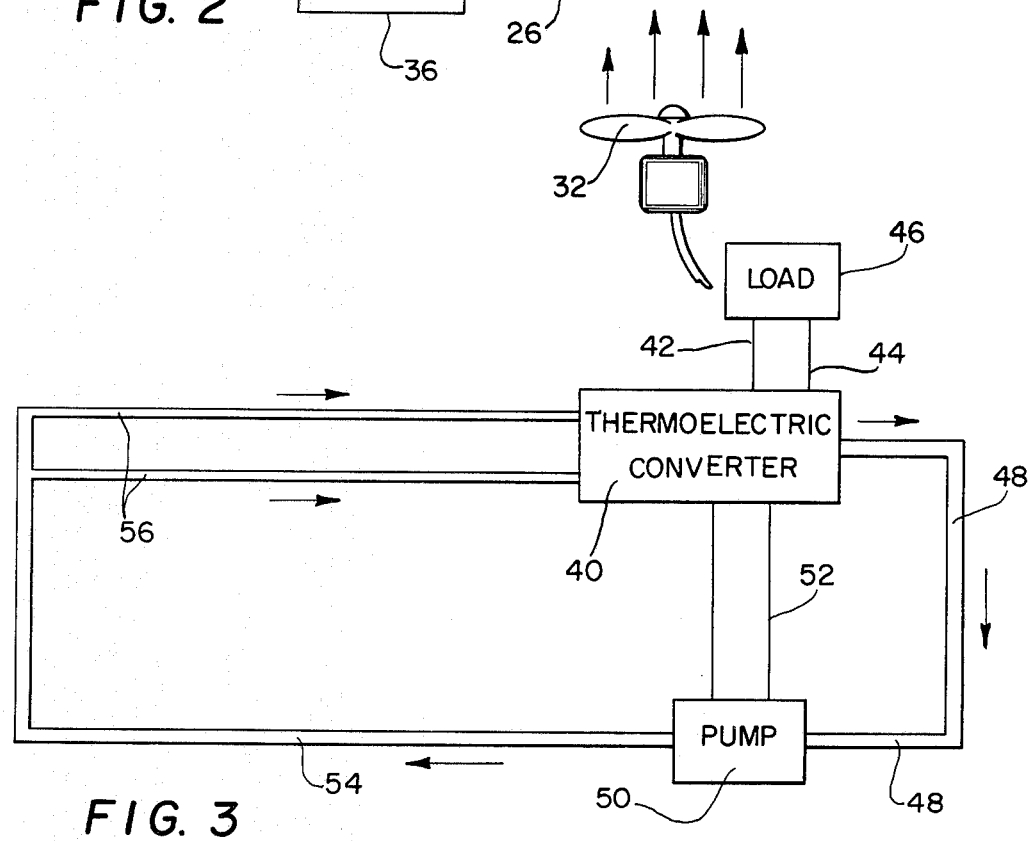

THERMOELECTRIC CONVERTER AND METHOD

BACKGROUND OF THE INVENTION

Devices for the direct conversion of thermal energy to useful electrical energy have been extensively investigated. These include thermionic converters working from extremely high temperatures and silicon cells utilizing the input thermal energy of solar radiation. Such devices are complex and comparatively expensive. At present they do not provide large enough amounts of usable electrical energy.

SUMMARY OF THE INVENTION

The present invention provides a simple apparatus for converting thermal energy into usable electrical energy. Two dissimilar metals, such as aluminum and brass, are formed into sheet or plate form and separated by a heat and electrical conductor. Water may be used as the separator and it is heated and caused to flow between the dissimilar metals. The metals will then act as electrodes from which the electrical power is tapped by suitable lines. The action is from the inside out, the fluid being heated and the heat traveling to the outside of the plates which can be air cooled or provided with additional cooling to provide a steep gradient from the inside out. In a variation, the heat can be applied to the outside of one of the metals and allowed to pass through the separator and through to the other of the metals which is cooled. In this case, the separator is preferably solid. The heat can be applied in any conventional manner and solar heat can readily be used. In circulating the hot fluid, a portion of the power generated may be used to operate a circulating pump. Any variation of the basic design will produce usable electrical power. If desired, the effect can be increased by placing a plurality of units in series, the metals running alternately. For example, the unit may have a typical series of brass-separator-aluminum-separator-brass-separator-aluminum, etc. The separator may be hot water or any other heat and electrical conductor.

DESCRIPTION OF THE DRAWINGS

In the drawings:

FIG. 1 is a fragmentary perspective view of one arrangement for converting thermal energy to electrical energy;

FIG. 2 is a section showing a variation of the arrangement shown in FIG. 1, utilizing a solid separator; and FIG. 3 is a diagrammatic view showing an arrangement using solar heat as the heat source.

DESCRIPTION OF THE INVENTION

The present invention comprises a thermoelectric converter for directly converting thermal energy into usable electrical energy. The device utilizes two dissimilar metals in any combination, including aluminum, brass, copper, steel or nickel.

The most important feature of the present invention is the separation of the metals. In the well known devices such as thermionic converters, thermocouples, or thermopiles, the metals are in direct contact with one another resulting in minute currents. Applicant has found that where the metals are separated and a separator is placed between them which is both heat and electrically conductive, usable electrical power will be obtained.

One form of the device is illustrated in FIG. 1. Two dissimilar metal plates 10 and 12 may be held at their edges by a non-conductor material 14, such as a ceramic insulator. A fluid such as water, including sea water, geothermal water, or ordinary tap water, is circulated at 16 between the metal plates. The plates 10 and 12 can be either aluminum, brass, copper, steel or nickel. They become electrodes and can be tapped through the lines 18 and 20 to the load 22.

By heating the water and circulating it between the plates, the heat will pass out through both metal plates. The outer surface of the plates may be cooled at room temperature but can be additionally cooled in any conventional manner. This cooling enhances the operation of the device and the conversion efficiency from heat to electricity. Therefore, the temperature differential between the heated water and the outside and the metal plates causes the flow of heat, $Q_w$, through the plates. Increasing the temperature differential increases the heat flux and therefore the resultant usable electrical power.

Of course, any type of heat may be used to heat the fluid 16. However, the device will operate if the heat is applied to the outside of one metal, for example 10, and the other metal 12 is cooled. In such cases, it may be more practical to use a solid separator instead of water. As can be seen in FIG. 2, the dissimilar metals 24 and 26 are separated by a material 28 which is heat and electrically conductive. A suitable plastic is one possibility. A sandwich is created with the metals on the outside.

As shown diagrammatically in FIG. 2, the metal 24 is heated by the solar heat 30 and the other metal 26 is cooled at 32. This will produce usable electrical energy, which may be tapped through the lines 34 and 36 to the load 38. Again, as in the previous form, the heat may be applied in any desirable manner and the cooling, 32, illustrated as a fan, can be any conventional cooling device. Increasing the thermal gradient between the plates 24 and 26 increases the electrical power output. It should be noted that nuclear heat on one side and a circulating cold water coolant on the other side could produce a considerable usable electrical power.

In those cases where a circulating fluid is the separator, as in FIG. 1, a small quantity of the electrical power produced may be used to operate a circulating pump, thus increasing the power output by maximizing the device efficiency with respect to flow.

The basic principles demonstrated in FIGS. 1 and 2 lend themselves to variations in design. FIG. 3 diagrammatically illustrates a workable system. A thermoelectric converter unit 40 of the present invention of the type shown in FIG. 1 is designed to produce a usable current through lines 42 and 44 to the load 46. The fluid or water passes from the unit 40 through pipes 48 to a circulating pump 50, wired at 52 to the unit 40 to use some of the electricity. The water passes from the pump 50 through pipes 54 to a multi-pipe solar heat collector utilizing conventional black heat absorbing pipes 56 which heat the water just before it enters the converter 40. Such a system, with suitable refinements, will efficiently produce a usable electrical energy from the solar heat collected at the pipes 56.

The thermoelectric converter of the present invention will thus operate with many types of heat sources, including solar, fossil, metabolic, nuclear, and geothermal heat. Furthermore, the device can utilize the heat in heated water arising from geothermal sources and the heat which, now being wasted, derives from the waste heat from other power plants.

As a result of the foregoing, the converter of the present invention and its operation requires substantially less monies than other types of power plants of comparable electrical output. It can be set up and built anywhere, requiring no local raw materials for its operation. It is compatible with the environment and produces no radiation.

Other advantages of the present invention will be readily apparent to a person skilled in the art.

I claim:

1. A thermoelectric converter comprising a pair of dissimilar metal members in spaced relation, a separating material filling the space between said members, said material being a flowing fluid heat conductive and electrically conductive, and means for applying a thermal gradient through said members and said material to generate usable electric power.

2. A converter as in claim 1, wherein said metals are from a group including aluminum, brass, copper or steel.

3. A converter as in claim 1, wherein said separating material includes water flowing between said metal members.

4. A converter as in claim 1, wherein the heat is applied to said separator and the gradient is outwardly through both of said metal members.

5. A converter as in claim 2, wherein said separating material includes water flowing between said metal members.

6. A converter as in claim 3, wherein the heat is applied to said water and the gradient is outwardly through both of said members.

7. A converter as in claim 5, wherein the heat is applied to said water and the gradient is outwardly through both of said members.

8. A converter as in claim 3, wherein the device includes a circulating pump for said water, said pump being operable by some of the electricity from the converter.

9. A converter as in claim 8, wherein the heat is applied to said water by various means including solar heat, nuclear heat, fossil fuel, or geothermal heat.

10. The method of converting thermal energy to electrical energy comprising placing two dissimilar metal members in spaced relation, filling the space between said members with a flowing fluid separator having heat and electrical conductivity, and applying heat to cause a thermal gradient in said converter to produce a usable electric power.

11. A method as in claim 10, wherein the heat is applied to said separator and said thermal gradient flows from the separator to the outside of said members, and cooling the outside of said members.

* * * * *